United States Patent
Meier et al.

(10) Patent No.: US 6,938,511 B2
(45) Date of Patent: Sep. 6, 2005

(54) DRIVE DEVICE FOR A MOTOR VEHICLE SUNROOF

(75) Inventors: Bernhard Meier, Kirchheim (DE); Thomas Kraus, Gauting (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/153,870

(22) Filed: May 24, 2002

(65) Prior Publication Data

US 2003/0008746 A1 Jan. 9, 2003

(30) Foreign Application Priority Data

May 25, 2001 (DE) ......................................... 101 25 581

(51) Int. Cl.[7] ............................................... F16H 1/16
(52) U.S. Cl. .......................... 74/425; 74/606 R; 310/89
(58) Field of Search ............................ 74/425, 606 R; 310/75 R, 68 B, 89

(56) References Cited

U.S. PATENT DOCUMENTS

| | | | | |
|---|---|---|---|---|
| 4,468,063 A | * | 8/1984 | Yukimoto et al. | 296/223 |
| 5,705,755 A | * | 1/1998 | Yamamura | 73/862.191 |
| 5,768,942 A | | 6/1998 | Gruber et al. | |
| 5,936,397 A | * | 8/1999 | Benkert et al. | 324/173 |
| 6,092,433 A | * | 7/2000 | Rose et al. | 74/335 |
| 6,127,752 A | * | 10/2000 | Wiesler | 310/68 B |
| 6,162,142 A | | 12/2000 | Hori et al. | |
| 6,199,322 B1 | * | 3/2001 | Itami et al. | 49/139 |
| 6,201,326 B1 | * | 3/2001 | Klappenbach et al. | 310/75 R |
| 6,528,915 B1 | * | 3/2003 | Moskob | 310/71 |

FOREIGN PATENT DOCUMENTS

DE 44 20 692 A1 12/1994

* cited by examiner

Primary Examiner—David M. Fenstermacher
(74) Attorney, Agent, or Firm—Nixon Peabody LLP; David S. Safran

(57) ABSTRACT

In a drive device, especially for a sunroof of a motor vehicle, with an electric motor (10) which has a pole shaft (16) located in a shaft housing (32), and a magnet (30) which is mounted on the pole shaft so as to rotate with it, and at least one Hall sensor (28) which is located outside the shaft housing for detecting the rotary position of the magnet and thus of the pole shaft, in the area of the Hall sensor (28), the wall (38) of the shaft housing (32) is, at the same time, part of the electronics housing (34) in which there is a board (26) which bears the circuitry of the electronic circuit for triggering the electric motor and at least one Hall sensor, such that the side of the board equipped with the Hall sensor faces the pole shaft (16) and the at least one Hall sensor is located directly adjacent to the magnet (30).

18 Claims, 4 Drawing Sheets

DRIVE DEVICE FOR A MOTOR VEHICLE SUNROOF

BACKGROUND OF THE INVENTION

1. Field of the Invention

This invention relates to a drive device, especially for displacement of the sliding roof of a motor vehicle, with an electric motor which has a pole shaft located in a shaft housing, and a magnet which is located on the pole shaft so as to rotate with the shaft, and at least one Hall sensor which is located outside of the shaft housing for detecting the rotational position of the magnet and thus of the pole shaft.

2. Description of Related Art

A drive device of the initially mentioned type is described in published German Patent Application DE-OS 44 20 692. Here, an electric drive motor and a worm gear pair which is coupled to the driven shaft of the motor are accommodated in a housing. In order to detect the rotational position of the driven shaft, a magnet is located on the driven shaft so as to rotate with it, and outside of the housing in which the driven shaft is located, there are Hall sensors on which pulses are produced upon rotary motion of the magnet in order in this way to detect the rotational position of the magnet, and thus, of the driven shaft. According to one embodiment of German Patent Application DE-OS 44 20 692, the Hall sensors are enclosed in their own housing which is then placed on the housing of the driven shaft. According to another embodiment, the Hall sensors are located on a carrier plate which is connected from the outside to the housing of the driven shaft so that, in this case, the carrier plate and the Hall sensors are freely accessible from the outside and are thus unprotected.

In both cases, the motor is triggered and the pulses which have been detected by the Hall sensors are evaluated in a control unit which is located at a distance from the drive device and which is not explained in detail in application DE-OS 44 20 692.

U.S. Pat. No. 6,162,142 discloses a drive device for a motor vehicle roof in which rotation of the driven shaft of the electric motor is tapped by means of a worm gear pair which is held in contact with the driven shaft by means of a housing which surrounds both the driven shaft and the worm gear pair. Furthermore, the housing has a housing area which is laterally offset next to the worm gear pair and in which there is a board on which there are components for triggering the drive motor and Hall sensors for detecting the rotational position of the driven shaft. The individual assemblies, especially the driven shaft and the worm gear pair which is driven by the driven shaft, are not shielded relative to the board so that there is the danger that the lubricant which is ordinarily provided between the driven shaft and the worm gear pair can leak onto the board and the components located on it; this can lead to an adverse effect on the function of these components and the Hall sensors.

Additionally, U.S. Pat. No. 5,768,942 discloses a drive for a motor vehicle roof in which the reducing gear and electrical circuit are accommodated in separate housing parts which are detachably joined to one another to enable flexible matching to different circuit layouts. The gear housing part is produced as a metal die casting and the electric housing part as an injection molded plastic part.

SUMMARY OF THE INVENTION

A primary object of this invention is to devise a drive device of the initially mentioned type which has a compact structure, in which weight and installation space are saved if possible as compared to the known devices, and in which reliable operation of the device is ensured even over a long period of use.

This object is achieved in a drive device of the initially mentioned type, in that in the area of the Hall sensor, the wall of the shaft housing is, at the same time, part of the electronics housing in which there is a board which bears the circuitry of the electronic circuit for triggering the electric motor and at least one Hall sensor, such that the side of the board equipped with the Hall sensor faces the pole shaft and at least one Hall sensor is located directly adjacent to the magnet. In this way, on the one hand, a compact and inherently closed drive device is provided, for which there need not be separate trigger electronics, but rather the trigger electronics are contained directly in the drive device, and in which it is still ensured that lubricant cannot travel from the mechanical part of the drive device, especially from the pole shaft, into the electronic part of the drive device, and thus, adversely affect operation of the electronic circuit for triggering the electric motor. Furthermore, in the drive device proposed here, by using the wall between the pole shaft and the Hall sensors, on the one hand, as the wall of the shaft housing, and on the other hand, as the wall of the electronics housing, both the weight as well as the amount of material which must be penetrated by the magnetic field of the magnet sitting on the pole shaft in order to reach at least one Hall sensor are kept low.

In accordance with another aspect of the invention, the wall of the shaft housing in the area of at least one Hall sensor can have a smaller wall thickness than the remainder of the shaft housing, and for this reason, the wall can have a recess which forms a window with a small wall thickness. In this way, on the one hand, at least one Hall sensor can be placed nearer the magnet sitting on the pole shaft, and on the other hand, the magnetic field proceeding from this magnet need penetrate less material to reach the Hall sensor.

If there are two or more Hall sensors, the wall of the shaft housing, preferably in the area of the Hall sensors, has a recess for each of the Hall sensors which forms a window with a small wall thickness. The crosspieces which remain between these windows and in which the wall thickness has not been reduced contribute to the stability of the housing.

Preferably, the electronics housing is at least part of the gear casing in which the worm gear pair, which has a worm wheel and which is driven by the pole shaft, sits. In this way, a worm gear pair, as is used, for example, if the drive device according to the invention is used for moving the sliding roof of the motor vehicle, is integrated advantageously into the drive device.

An extremely compact drive device can be implemented here by the board which bears the circuitry of the electronic circuit for triggering the electric motor and at least one Hall sensor not being located next to the worm gear pair, as was proposed in the past in the prior art, but instead extends at least partially, preferably completely, over the worm wheel.

In order to preclude escape of lubricants from the worm gear pair and thus possible fouling of the boards and the risk of a malfunction of the components located on the board due to these lubricants, the gear casing surrounds the worm wheel preferably completely and seals it relative to the board.

The electronics housing preferably has a lower part which encloses the shaft housing and a cover which interacts with the lower part. Here, the lower part of the electronics housing can also form the lower part of the gear casing in which a worm gear pair, which has a worm wheel and which is driven by the pole shaft, sits.

Similarly to the partial integration of the shaft housing into the electronics housing, this (partial) integration of the gear casing into the electronics housing, on the one hand yields an extremely compact drive device in which, on the other hand, the mutual integration of the individual housing sections saves not only material and thus weight, but at the same time, also increases the stability of the entire device, especially when the lower part and the cover of the electronics housing are each one-piece shaped components in which the subdividing walls between the individual housing sections, i.e., the electronics housing which accommodates the board, the shaft housing and the gear casing, are used at the same time as reinforcements of the entire arrangement.

The weight of this drive device can be further reduced if the shaft housing and the electronics housing are made, not as in the conventional manner as metal die castings, but from plastic.

In another embodiment of the invention, the electronics housing preferably has sleeve-shaped penetrations for fasteners, such as screws, in order to attach the drive device adjacent to the device to be driven, for example, a worm shaft which is connected to the compressively stiff drive cable for moving the movable cover element of a motor vehicle roof. Here, the penetrations are preferably located along one side wall of the electronics housing so that part of the wall of the penetration can be at the same time part of the side wall, by which on the one hand provision is made for a connection of the penetrations to the housing as stable as possible and on the other hand for reduced material cost and thus weight.

Preferably, at least one of the penetrations is located within the outside periphery of the electronics housing and forms part of the side wall of the electronics housing, by which the torsional stiffness of the penetration relative to the housing can be further increased.

If the electronics housing is made of plastic, preferably there are metallic reinforcing sleeves in the penetrations. Here, compressive stress of the penetrations can be prevented in the direction of the penetration when the fasteners which have been inserted through the penetrations are tightened when the length of the metallic reinforcing sleeves provided in the penetrations corresponds to the length of the penetrations.

Furthermore, in another embodiment of the invention the electronics housing has reinforcing ribs for improving stability.

If the lower part of the electronics housing, at the same time, forms the lower part of the gear casing in which, furthermore, there is a through opening for the driven shaft of the worm gear pair, preferably there are reinforcing ribs which run radially to this through opening. Since the forces or counterforces acting on the drive means are applied via the drive connection between the drive device and the device to be driven, these reinforcing ribs best accommodate the forces acting on the drive device and thus the housing which surrounds the drive device. Here, it is especially advantageous to provide reinforcing ribs which extend from the through opening for the driven shaft of the worm gear pair (and thus from the site of force application) to the penetrations to which the drive device is attached, for example, on the vehicle (and thus to the site of force departure).

One preferred embodiment of the drive device proposed here is explained in detail below with reference to the accompanying drawings.

DETAILED DESCRIPTION OF THE INVENTION

Figure 1:
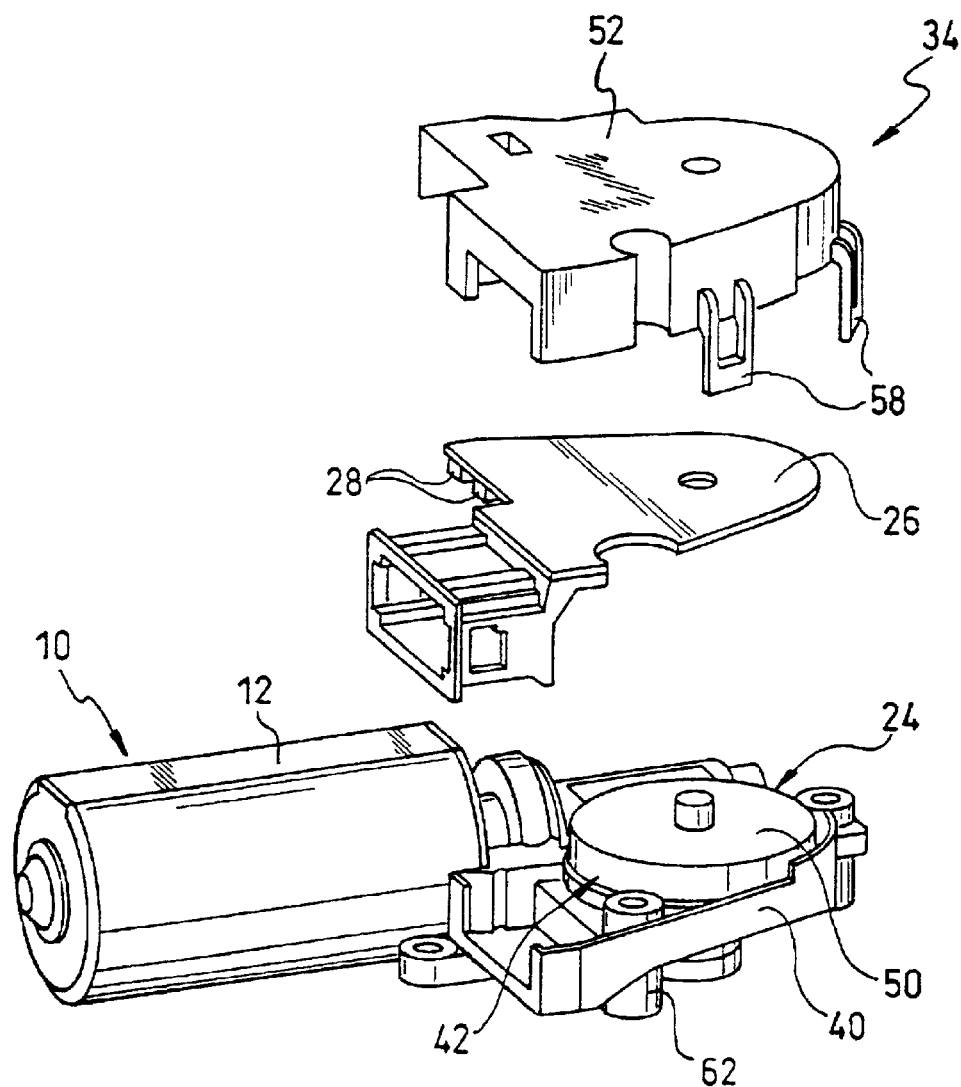
FIG. 1 shows a schematic, exploded perspective of a drive device in accordance with the invention seen obliquely from above.

The drive device shown in FIGS. 1 to 4 has an electric motor 10 which has an armature 14 (see FIG. 4) surrounded by a pole cup 12 (see FIG. 1), a motor shaft or pole shaft 16 and a brush system 18 which is provided via motor contacts 20 with an electronic circuit 22 for triggering the motor. The front area of motor shaft 16 bears a worm shaft (not shown) which engages a worm wheel 24. The concept "bears" here is intended to encompass both a worm shaft which is formed as a separate component and also a worm shaft which is made in one piece with the motor shaft 16. The step-down gearing formed in this way is used to drive a movable component, especially the cover element of an openable motor vehicle roof, for example, the cover of a sliding roof or lifting and sliding roof or the louver of a louvered roof.

Figure 2:
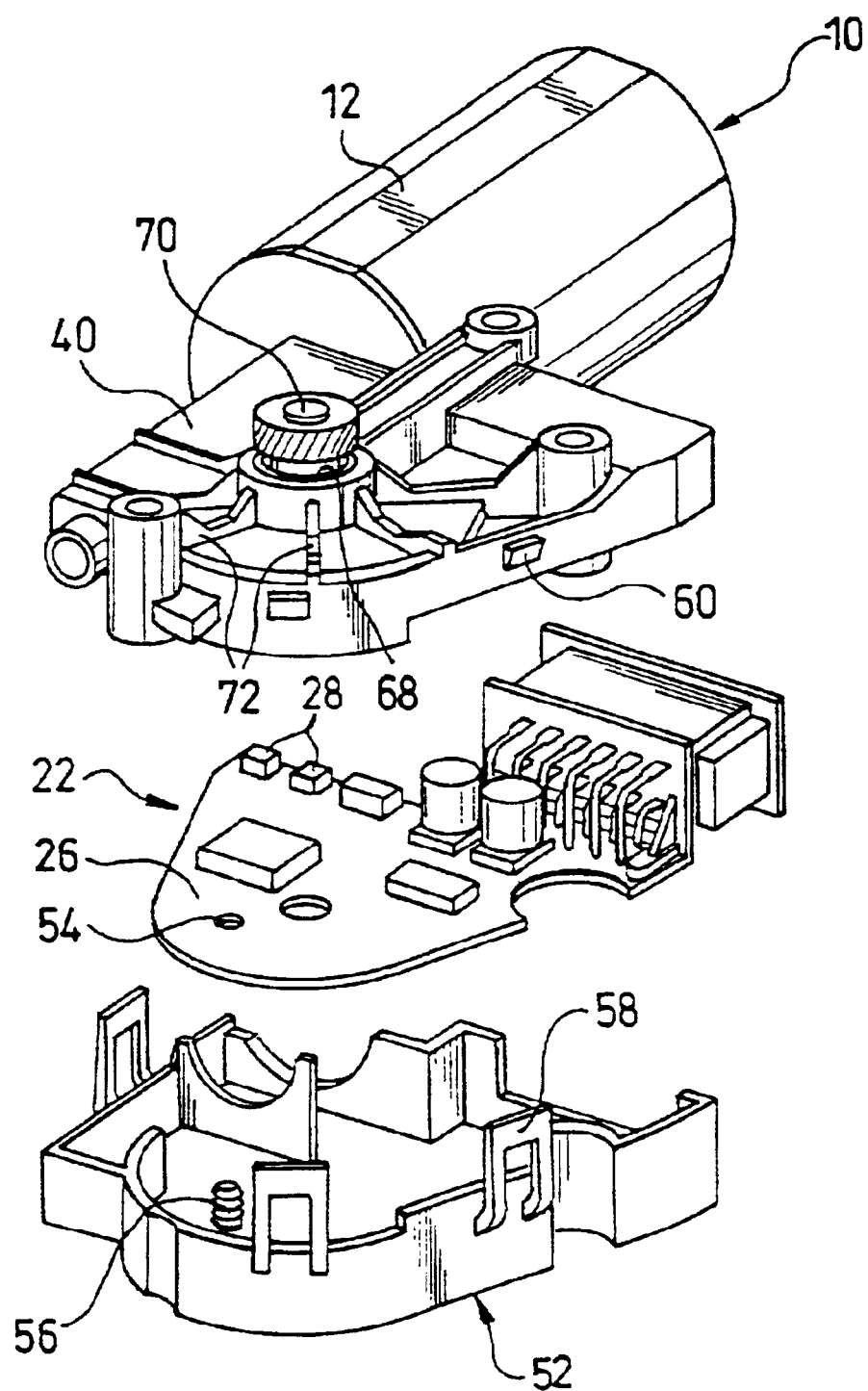
FIG. 2 shows a schematic, exploded perspective of a drive device in accordance with the invention of FIG. 1 seen obliquely from below.
Figure 3:
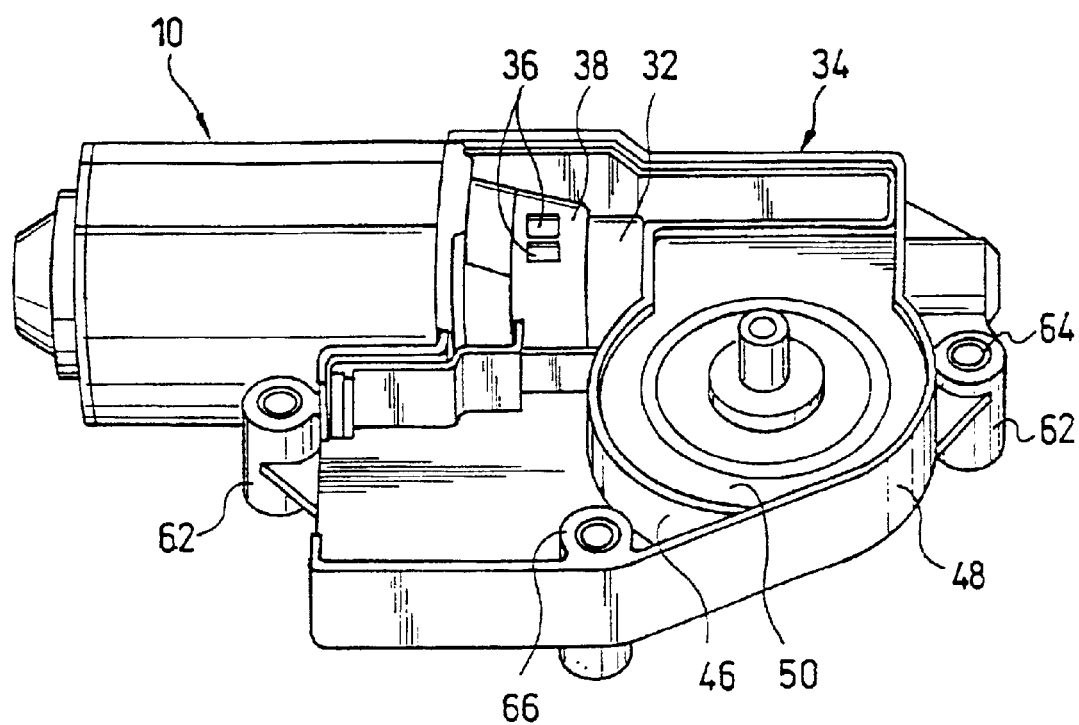
FIG. 3 is a schematic perspective of the lower part of the drive device which is shown in FIG. 1.
Figure 4:
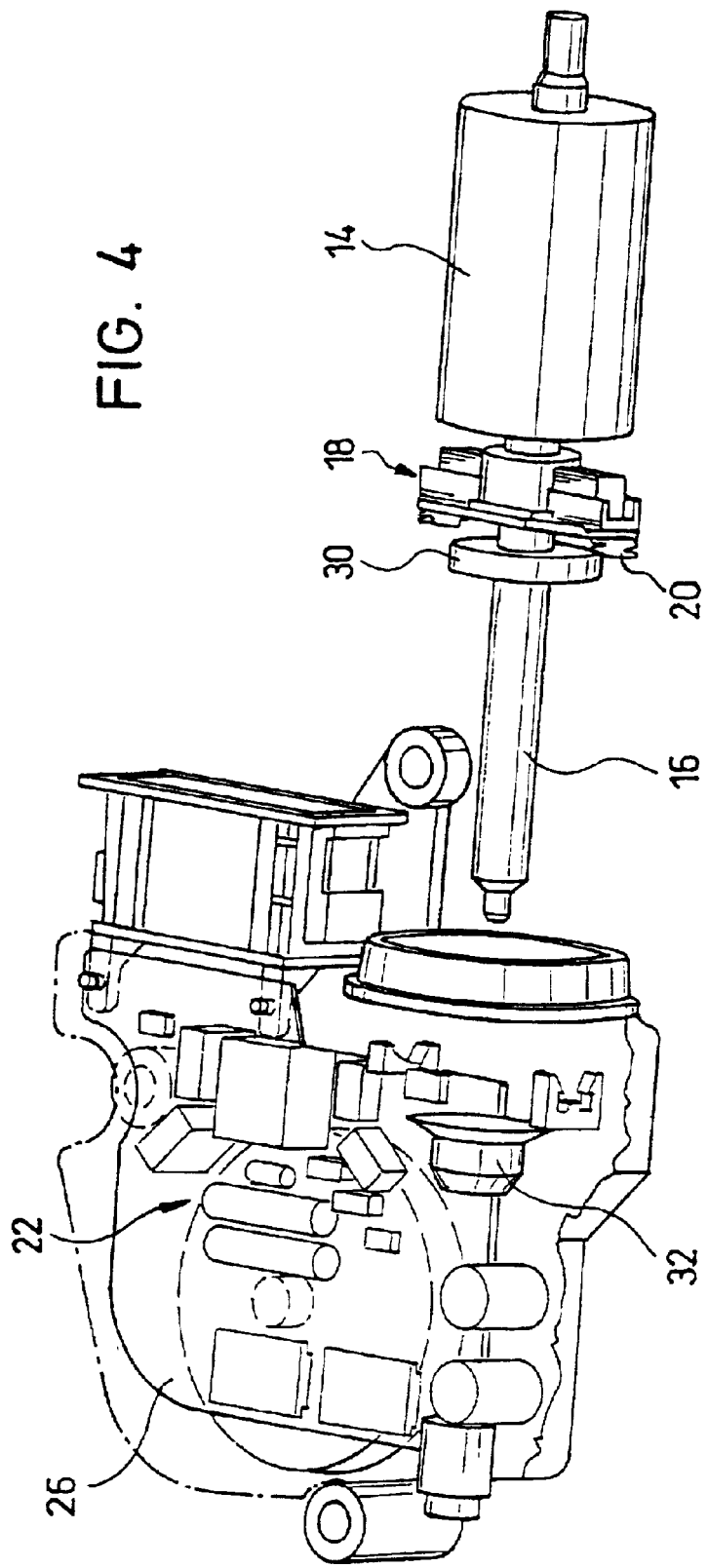
FIG. 4 is a schematic perspective of the drive device of FIGS. 1 to 3, in which the drive motor together with the pole shaft has been pulled out of the shaft housing.

The trigger electronics 22 for the motor 10 is accommodated on a circuit board or a board 26 which extends over the worm wheel, as shown in FIGS. 1 & 2. Furthermore, on the board 26, there are two Hall sensors 28 to detect the rotary position of the magnet and thus of the pole shaft by detecting the magnetic field emanating from the magnet wheel 30 which is located on the pole shaft 16. To keep the installation space of the electronic circuit for triggering the motor 10 as small as possible, the board 26 is preferably equipped on both sides with components, especially SMD components. However, here it goes without saying that the Hall sensors 28 are located on the side of the board 26 facing the pole shaft 16. As follows especially from FIGS. 3 & 4, the pole shaft 16, in the completely mounted state of the drive device, is located within the shaft housing 32; an upward facing side of the shaft housing 32 in FIG. 3 is, at the same time, the bottom of the electronics housing 34 which holds the electronics 22, and which is preferably made of plastic. As follows especially from FIG. 3, the pole shaft 16 is surrounded by the shaft housing 32 such that there is no connecting opening between the shaft housing 32 and the electronics housing 34 through which, for example, a lubricant of the pole shaft 16 can escape toward the board 26. Furthermore, the wall 38 which connects the shaft housing 32 and the electronics housing 34, in the area of the Hall sensors 28, has recesses which form a window 36 for each of the Hall sensors 28 with a smaller wall thickness.

With reference to FIGS. 1 & 2, again, the electronics housing 34, and especially the lower part 40 which is connected to the motor 10, at the same time, forms the lower part of the gear casing 42 in which the worm wheel 24 that engages the pole shaft 16 is housed. Preferably, for this purpose, the electronics housing 34 has a wall 46 which surrounds the worm wheel 24, the lower part of the gear casing which is formed by the bottom of the electronics housing 34, the wall 46 and part of the side wall 48 of the electronics housing 34 being closed by means of a cover 50 relative to the remaining interior space of the electronics housing 34.

Dividing the electronics housing 34 into several closed housing sections, as suggested here, yields an extremely compact configuration of the drive device in which all the components necessary to move the device which is to be driven are housed, and in which the individual assemblies are located spatially separated from one another, and especially the mechanical part of the drive device which encompasses the pole shaft and the gearing is separated from the electrical part of the drive device which encompasses the electronic circuit, forming a seal, so that lubricant from the mechanical part cannot reach the electrical part; thereby preventing temporary or even permanent impairment of the operation of electrical or electronic components which could be caused by the lubricant.

To facilitate installation of the drive device, the cover 52 of the electronics housing 34 is preferably made such that the board 26 is inserted into the cover and can be locked there. For this purpose, as is shown in FIG. 2, the board 26 can have, for example, openings 54 through which the catch projections 56 which are provided on the cover 52 extend when the board 26 is inserted into the cover and which lock the board in the cover. To attach the cover 52 to the lower part 40 of the housing there are likewise preferably catch connectors. For example, as shown in FIGS. 1 & 2, there can be clip elements 58 which lock onto the corresponding catch projections 60 which are made on the lower part 40 when the cover 52 is seated on the lower part 40. To attach the drive device, for example, in a motor vehicle, there are penetrations 62 on the electronics housing 34 through which fasteners (not shown), for example, screws, can be inserted in order to attach the drive device.

As can be seen in FIG. 3, there are metallic reinforcing sleeves 64 in the penetrations 62. Sleeves 64 have a length which is matched to the length of the penetrations in order to prevent compressively stressing the material which forms the penetrations when the mounting screws are tightened. The penetrations 62 are all located along the outer periphery of the electronics housing 34 and are integrated into its side edge 38. In order to further increase the strength of the housing and especially of the fastening points of the housing, at least one of the penetrations 62 can be located within the outside contour of the electronics housing, as is indicated at 66 in FIG. 3.

Furthermore, as shown in FIG. 2, on the bottom of the lower part 40 of the electronics housing 34 in which there is a through opening 68 for the driven shaft 70 of the worm gear pair, there are reinforcing ribs 72 which preferably run radially toward the through opening 68. In order to better resist the shear forces acting on the electronics housing which occur when forces act via the driven shaft 70 on the drive device, which in turn is supported on the penetrations 62, for example, against the fixed motor vehicle roof frame, there are reinforcing ribs 72 between the through opening 68 and the individual penetrations 62.

As follows from the description above, the drive device proposed here represents an extremely compact, closed device. With the aid of the measures explained here the electronics housing in which preferably the shaft housing and the gear casing are at least partially integrated can be made of plastic so that not only the space required for housing the drive device, but also the total weight of the drive device can be reduced without adversely affecting stability.

What is claimed is:

1. Drive device for a sunroof of a motor vehicle, comprising:
    an electric motor having a pole shaft;
    a shaft housing in which the pole shaft is located;
    a magnet mounted on the pole shaft so as to rotate with the pole shaft;
    an electronic circuit for triggering the electric motor;
    at least one Hall sensor which is located outside of the shaft housing for detecting the rotational position of the magnet and of the pole shaft, and
    an electronics housing in which said electronic circuit and said at least one Hall sensor are located;
    wherein, a wall of the shaft housing in an area of the at least one Hall sensor forms part of the electronics housing, said wall of the shaft housing in he area of the at least one Hall sensor having a smaller thickness than a remainder of the shaft housing and having a recess which forms a window with a small wall thickness for receiving the at least one Hall sensor; wherein a board bears the electric circuit for triggering the electric motor and the at least one Hall sensor; wherein the at least one Hall sensor is located on a side of the board which faces the pole shaft directly adjacent to the magnet; wherein a respective window recess is formed in the wall of the shaft housing in the area of each Hall sensor by a wall area of the shaft housing that has a smaller wall thickness than that of the remainder of the shaft housing.

2. Drive device as claimed in claim 1, wherein said at least one Hall sensor comprises at least two Hall sensors.

3. Drive device as claimed in claim 1, wherein electronics housing forms at least part of the gear casing; and wherein a worm gear pair is provided in said gear casing, the worm gear pair having a worm wheel which is driven by the pole shaft and which sits on the pole shaft.

4. Drive device as claimed in claim 3, wherein the board extends at least partially over the worm wheel.

5. Drive device as claimed in claim 4, wherein the gear casing completely surrounds the worm wheel and seals it relative to the board.

6. Drive device as claimed in claim 1, wherein the electronics housing has a lower part which encloses the shaft housing and a cover which interacts with the lower part.

7. Drive device as claimed in claim 6, wherein the lower part of the electronics housing forms a lower part of the gear casing, and wherein a worm gear pair is provided in said gear casing, the worm gear pair having a worm wheel which is driven by the pole shaft and which sits on the pole shaft.

8. Drive device as claimed in claim 7, wherein the cover has means for locking the board to the cover.

9. Drive device as claimed in claim 1, wherein the shaft housing and the electronics housing are made of plastic.

10. Drive device as claimed in claim 5, wherein the gear casing has a cover which is located within the electronics housing for closing the gear casing.

11. Drive device as claimed claim 1, wherein the electronics housing has sleeve-shaped penetrations for fasteners in order to attach the drive device adjacent to the device to be driven.

12. Drive device as claimed in claim 11, wherein penetrations are each located along a side wall of the electronics housing.

13. Drive device as claimed in claim 12, wherein at least one of the penetrations is located on the outside periphery of the electronics housing and forms part of the side wall of the electronics housing.

14. Drive device as claimed in claim 13, wherein the electronics housing is made of plastic and there are metallic reinforcing sleeves in the penetrations.

15. Drive device as claimed in claim 1, wherein the electronics housing has reinforcing ribs.

16. Drive device as claimed in claim 7, wherein the electronics housing has reinforcing ribs; wherein a through opening is provided in the lower part of the gear casing for a driven shaft of the worm gear pair, and wherein said reinforcing ribs run radially relative to said through opening.

17. Drive device as claimed in claim 7, wherein the electronics housing has reinforcing ribs; wherein the electronics housing has sleeve-shaped penetrations for fasteners to attach the drive device adjacent to a device to be driven; wherein a through opening is provided in the lower part of the gear casing for a driven shaft of the worm gear pair and at least one of the reinforcing ribs extends from the through opening to one of the penetrations.

18. Drive device as claimed in claim 1, wherein the respective window recess in the wall of the shaft housing is formed in a surface of the shaft housing that faces away from the pole shaft.

* * * * *